United States Patent [19]

Hahn

[11] 4,120,988

[45] Oct. 17, 1978

[54] PROTEIN SNACK PRODUCT OF IMPROVED STRUCTURAL INTEGRITY

[75] Inventor: David T. Hahn, St. Louis, Mo.

[73] Assignee: Ralston Purina Company, St. Louis, Mo.

[21] Appl. No.: 834,755

[22] Filed: Sep. 19, 1977

[51] Int. Cl.² ............................ A23L 1/34; A23J 3/00
[52] U.S. Cl. .................................... 426/573; 426/656; 426/440; 426/444; 426/445; 426/457
[58] Field of Search ............... 426/104, 573, 656, 438, 426/440, 515, 524, 804, 657, 445, 444, 456

[56] References Cited

U.S. PATENT DOCUMENTS

| | | | |
|---|---|---|---|
| 3,851,081 | 11/1974 | Epstein | 426/573 X |
| 3,900,577 | 8/1975 | Haas | 426/524 X |
| 3,968,268 | 7/1976 | Sair et al. | 426/104 X |
| 3,989,855 | 11/1976 | Jones et al. | 426/524 X |
| 4,031,267 | 6/1977 | Berry et al. | 426/656 |

Primary Examiner—Robert A. Yoncoskie
Attorney, Agent, or Firm—W. Dennis Drehkoff; Veo Peoples, Jr.

[57] ABSTRACT

A protein-based snack food product and its method of manufacture are disclosed. The process negates the need for carbohydrate, starch or farinaceous ingredients in the product formulation. Yet the product will expand or puff and will maintain its structural integrity during deep fat frying.

3 Claims, No Drawings

PROTEIN SNACK PRODUCT OF IMPROVED STRUCTURAL INTEGRITY

BACKGROUND OF THE INVENTION

The prior art has taught a wide variety of processes for producing snack food products and products made by a number of these processes are currently available to the consumer. Typically, many of these products are deep fat fried to give the product an expanded configuration. However, the fat fried products of the art have the disadvantages of absorbing too much fat on frying, as well as containing substantial amounts of carbohydrates, resulting in a product which has a high energy content and which is not acceptable to consumers who want a low calorie snack product. To avoid the problem of high fat content, it has been suggested that snack products be formed from a dough containing a low fat content and cooked by high temperature oven drying or by exposure to microwave or infrared radiation rather than frying. These methods do avoid the problem of high fat content in the product, but fail to produce the high palatability which is developed in the frying process.

It has also been suggested that in order to reduce the calories of snack products, protein alone, e.g., soybeans, be used in cooked form to make a snack-type wafer. However, it was found that, as for example in U.S. Pat. No. 3,911,142, there was insufficient starch or other binder to cohere the particles, thus causing crumbling, generally poor structural integrity and a less than desirable mouth feel. If additional water was added, then the raw mass became sticky and unmachineable during processing.

U.S. Pat. No. 3,244,538 describes a process for reducing the fat content of fried foods which involves first drying the food, then cooling it. Generally, the process leads to case hardening or formation of a hard outer shell which prevents loss of moisture from the core of the product and reduces fat absorption from the outside. This product is useful in french frying potatoes or in making potato chips. However, in making a high protein snack product a case hardened exterior and moist interior is fatal because the texture and mouth feed are undesirable, plus the capability of the product to puff or expand is adversely affected.

SUMMARY OF THE INVENTION

The present invention relates to the formation of a snack food product. The product is made from a mixture of water and protein source material but has a crisp, cellular structure of unique integrity. Even though there is no starch nor binder material present, the snack product can be formed and deep fat fried without becoming soft, crumbly or losing cohesiveness. Clearly, the snack has a lower level of calories yet has the pleasing palatability of deep fat fried products.

The keys to the manufacture of this unique snack product are first the formation of a fully hydrated irreversible protein gel, then the freezing of the gel and followed by drying the gel. The freezing and drying steps if applied in that order, provide a process and product distinct from the art of snacks containing added starch and superior to the art of snacks not containing added starch.

It is believed that free water during freezing serves to break the continuity of the gel and form pockets of ice crystals. Thus, the unique cellular structure is set when the product is dried because the pockets create a system of passageways permitting the moisture (even at the center of the product) to escape which in turn leaves a system of cavities or cells scattered homogeneously throughout the product. The drying also serves to partially heat set the protein. Then, emersion in hot oil and frying completes the process by having the heat from the oil expand the air which stretches, puffs or expands the interior cell walls and which finally adds the crispy texture by thorough cooking and heat setting of the proteinaceous gel. It should be mentioned here that if the gel is dried prior to freezing, then apparently because of premature gel setting or for some other reasons, a different product is formed. Please note that these theories are offered to explain the present discovery based upon observation and to provide understanding where there are previously ignorance. Accordingly, the above reasoning should not be permitted to detract from nor limit the true scope of this invention.

DESCRIPTION OF THE PREFERRED EMBODIMENTS

The concept of this invention pertains broadly to a process for producing protein-based snack food products.

The protein source material may be any of the high purity protein sources which form upon hydration, an irreversible gel such as oilseed protein isolates. Soy protein isolates containing at least about 90% protein on a dry basis are preferred.

An aqueous slurry containing at least about 20% protein solids is prepared and mechanically worked from a sticky paste or dough into a continuous plastic gel. This indicates that the protein is fully hydrated. The gel is then subjected to cooling action sufficient to form ice crystals of the free water, e.g., freezing. The gel is formed into the desired shape either before or after freezing. The product is then dried sufficiently to melt the ice crystals and drive off such moisture while partially heat setting the protein. Thorough drying of the product throughout its cross section is necessary (without surface skin formation) thus slower drying rates are advantageous. For example, temperatures of 180° to 250° F. are advisable. The desired dryness is from about 5 to 20%, and preferably 8 to 10%. Finally, the product is immersed into hot oil and deep fat fried at conventional frying temperatures, wherein the product will expand or puff.

The product has excellent structural integrity and a cripsy cellular structure. However, without the freezing and drying the procedure leads to a soft crumbly product of little structural integrity and little desirability as a snack product.

The end product is typically characterized by containing at least 40% protein, less than 50% fat of absorption and about 2% water yet it retains excellent structural integrity without the need of a starch or binder. It should be understood that salt and various flavorings can be added. The following examples are intended to illustrate the invention.

EXAMPLE I

One part of soy protein isolate is added to a blending device containing four parts of water and is mixed until full hydration of the soy into a continuous plastic gel is accomplished. Two percent salt is dispersed into the mixture. The gel is placed into molds and frozen. The formed product is removed from the molds, thawed and sliced while still partially frozen (for convenience). The product is dried at about 200° F. until about 8% moisture remains. Then the product is deep fat fried at 400° F. for 10-15 seconds.

The product puff and is pleasingly crispy, cellular with good cohesion and structural integrity.

EXAMPLE II

The same as Example I except that after hydration of the protein, the product was refrigerated overnight rather than freezing and drying it. Then it was deep fat fried. The product was soft and crumbly with a soggy mouth feel and undesirable as a snack chip or wafer.

EXAMPLE III

The same as Example I except the product was dried prior to freezing and then fried. The product did not puff and had a soggy middle.

What is claimed is:

1. A method for making an improved fat fried puffed protein snack product comprising:
    (a) preparing an aqueous slurry consisting essentially of water and at least 20% by weight of oilseed protein isolate;
    (b) mechanically working the slurry under ambient conditions into a fully hydrated irreversible, plastic gel;
    (c) forming the gel into a desired shape;
    (d) cooling the shaped gel sufficiently to form ice crystals of the free water;
    (e) drying the formed and cooled gel to from 5 to 20% moisture; and
    (f) deep fat frying the dried gel to produce said product.

2. The method of claim 1 wherein the product is dried to from 8 to 10% moisture.

3. The method of claim 1 wherein the product is fried at 400° of for 10-15 seconds.

* * * * *